United States Patent [19]
Hamada et al.

[11] Patent Number: 5,805,528
[45] Date of Patent: Sep. 8, 1998

[54] UNDERWATER DETECTION SYSTEM

[75] Inventors: Tokihiko Hamada, Kobe; Yoshinari Yoshida, Takarazuka; Yuzuru Hiraoka, Moriguchi; Genzi Mori, Kobe; Hiroyasu Fujimoto, Kobe; Yoshiki Tominaga, Kobe; Tatsuo Hayashi, Takarazuka, all of Japan

[73] Assignee: Furuno Electric Co., Ltd., Hyogo, Japan

[21] Appl. No.: 610,941

[22] Filed: Mar. 5, 1996

[51] Int. Cl.$^6$ .................................................. G01S 15/89
[52] U.S. Cl. .............................................. 367/111; 367/88
[58] Field of Search .................................... 367/111, 104, 367/7, 11, 99, 88

[56] References Cited

U.S. PATENT DOCUMENTS

| | | | |
|---|---|---|---|
| 4,829,492 | 5/1989 | Choi et al. | 367/111 |
| 4,935,906 | 6/1990 | Baker et al. | 367/111 |

FOREIGN PATENT DOCUMENTS

| | | |
|---|---|---|
| 59-4674 | 1/1984 | Japan . |
| 63-26876 | 5/1988 | Japan . |
| 64-30467 | 2/1989 | Japan . |

*Primary Examiner*—Daniel T. Pihulic
*Attorney, Agent, or Firm*—Jordan and Hamburg

[57] ABSTRACT

An underwater detection system for displaying underwater conditions over a large area around a ship comprises a linear array type transducer, a transducer training mechanism for rotating the transducer stepwise in a horizontal plane, a receiver which forms a receiving beam for scanning a fan-like vertical cross-sectional area by giving specified time delays or phase differences to echo signals received by the transducer, an image memory for storing echo signal data picked up by the receiving beam in addresses defined by horizontal directions relative to the ship and depths, a sampling circuit for reading out data of one vertical line after another in a downward direction from the image memory and determining a bottom depth in each vertical line, a seabed data memory for storing bottom depths, a PPI image generator for producing a fractional PPI image depicting the bottom based on bottom depth data read from the seabed data memory, and an indicator for presenting search results in the form of a plan view covering a large area of search around the ship by jointly displaying fractional PPI images produced by the PPI image generator.

22 Claims, 18 Drawing Sheets and receiving echoes returned from a vertical cross-sectional area oriented in a desired horizontal direction; a transducer training mechanism for successively rotating the transducer in a horizontal plane with its transmit/receive surface facing downward in steps of a specified angle; a memory for storing received echo signals containing information on each vertical cross-sectional area searched by the transducer; and an indicator for displaying a plan view of the area of search based on the echo signals stored in the memory.

UNDERWATER DETECTION SYSTEM

BACKGROUND OF THE INVENTION

The present invention relates generally to a detection system for detecting and displaying surrounding conditions and, more particularly, to an apparatus which is capable of displaying underwater conditions over a large area of search around a moving body in the form of a plan view.

Scanning sonars and searchlight sonars have been well-known apparatuses for displaying underwater objects existing mainly in horizontal directions around own ship. FIG. 1 shows a transducer T used in a full-circle scanning sonar. The transducer T works in the following manner to form multiple beams pointed in different directions. Having generally a cylindrical shape, the transducer T comprises m layers of annular arrays stacked one on top of another, each annular array including n transducer elements $T_1, T_2, T_3, \ldots T_n$. All the transducer elements are excited together in each transmission cycle to transmit ultrasonic waves all horizontal directions around own ship. A plurality of beams are then formed successively by way of electronic beam forming to receive echoes from underwater objects. More specifically, transducer elements $Tx_1, Tx_2, Tx_3, \ldots Tx_m$ included in each vertical column, or a "stave," are given specified time delays respectively to produce a receiving beam tipped to a desired tilt angle θ when reflected echoes are received. Furthermore, seven staves of transducer elements, for instance, are operated together in such a way that individual receiving beams produced by the seven staves and set to a common tilt angle q are combined by using a phase synthesis technique to form a single receiving beam B having a sharp beam angle pointed in the central direction of the seven staves as shown in FIG. 2. The combination of seven staves of transducer elements is sequentially shifted one stave at a time in a circumferential direction so that the receiving beam B is moved stepwise along the curved surface of a circular cone as shown in FIG. 3.

FIG. 4 is a diagram showing a vertical cross section of the receiving beam B depicted in FIG. 3 while FIG. 5 is a diagram showing a seabed search area $S_1$ swept by the rotating receiving beam B. As is apparent from FIG. 5, the search area $S_1$ is ring-shaped, encircling the position of a ship Q. Beam angle τ shown in FIG. 4 is usually narrow, e.g., 10°, and objects existing outside this angle can not be detected. The beam angle may be widened to avoid this inconvenience as shown in FIG. 6. However, echoes situated at the same range, but separated in azimuth, cannot be discriminated from each other within the beam angle. This means that echoes of objects A and B located on the circumference of the same circle around the transducer T overlap one another when displayed on a screen of a plan position indicator (PPI). It is therefore impossible to determine horizontal ranges $h_a$ and $h_b$ from the ship to the individual objects A and B. Moreover, an object C located at a greater distance than the depth of the seabed just beneath the ship cannot be detected because its echo would be "buried," or masked, in stronger seabed returns.

Other types of conventional underwater detection system include semicircle scanning sonars which employ an array-type transducer for searching a semicircular area $S_2$ as shown in FIG. 7, by scanning within a vertical plane passing through a vertical line extended exactly downward from the ship Q as well as sector scanning sonars and searchlight sonars which scan through a vertical search area. These types of sonars provide a cross-sectional view covering a large search area cut by a vertical plane. Although this kind of presentation allows recognition of horizontal and vertical ranges to underwater objects existing within a vertical search area, information shown on an indicator at one time is limited to a particular direction and it is not intended to provide a full-circle display.

An underwater sounding apparatus disclosed in Japanese Examined Patent Application No. 59-4674 (1984) has the capability to search all surrounding conditions around a ship by training a transducer stepwise each time it scans a vertical cross-sectional area shown in FIG. 7. Although the apparatus of the disclosure has as an object the provision of a three-dimensional presentation of detected objects, it does not allow recognition of target information all around the ship at at time.

Japanese Unexamined Patent Application No. 63-26876 (1988) discloses an underwater sounding apparatus, which may be either the aforementioned scanning sonar or searchlight sonar, capable of covering a full-circle area around a ship while varying the tilt angle of a beam stepwise each time it completes a search along the curved surface of a circular cone. It is however inevitable that an electric circuit for varying the tilt angle of the receiving beam B formed by the transducer T of FIG. 1, for instance, requires a complicated circuit configuration. Another problem of this beam tilting scheme is that resulting vertical angular resolution is poor because the tilt angle can only be varied in a step-by-step manner. Moreover, it is impossible to search areas just beneath own ship due to the structure of the transducer T. According to the disclosure, a display screen of the apparatus is divided into a plan view area $S_4$, as shown in FIG. 8, for showing a plan view of a search area and a cross-sectional view area $S_5$ for showing a cross-sectional view cut by a vertical plane containing a target of interest displayed on the plan view. Although the disclosed apparatus provides a large coverage, it does not allow instantaneous recognition of a large area.

Japanese Unexamined Utility Model Application No. 64-30467 (1989) discloses a seabed topography display system which presents a picture depicting topographic features of a large area of seabed. While scanning at right angles to a ship's course line, this system detects and displays echoes from only the seabed. According to the disclosure, the system cannot present echoes of fish schools and it is impossible to provide underwater target information from all directions around the ship (which should preferably be kept at a fixed point).

SUMMARY OF THE INVENTION

The present invention overcomes the foregoing problems of the prior art. Accordingly, it is an object of the invention to provide an underwater detection system which is capable of detecting and presenting seabed depths and underwater objects located in a large area around a ship in a PPI format.

In one preferred embodiment of the invention, an underwater detection system which is capable of searching a large area around a ship comprises a transducer for transmitting ultrasonic waves and receiving echoes returned from a vertical cross-sectional area oriented in a desired horizontal direction; a transducer training mechanism for successively rotating the transducer in a horizontal plane with its transmit/receive surface facing downward in steps of a specified angle; a memory for storing received echo signals containing information on each vertical cross-sectional area searched by the transducer; and an indicator for displaying a plan view of the area of search based on the echo signals stored in the memory.

According to this embodiment, the underwater detection system employs a linear array type transducer to form a narrow receiving beam. The receiving beam is steered in the direction of the array of transducer elements (arrow A in FIG. 9) to scan a narrow strip of bottom area $S_1$ beneath the ship, as shown in FIG. 9. This area $S_1$ actually takes a two-sided fan-like shape as shown in FIG. 10 because a sound beam becomes wider farther away from its source. Water depths of the bottom area $S_1$ are determined in this scanning process, for instance. Next, the transducer is rotated by a small angle in a horizontal plane (arrow B in FIG. 9) to vary the direction of the array, and water depths of a bottom area $S_2$ shown in FIG. 10 are determined in a subsequent process. Water depth information is displayed on the indicator like a cathode ray tube (CRT) for each successive two-sided fan-like bottom area. Sounding of a full-circle bottom area $S_0$ around the ship is completed when the transducer has been rotated 180 degrees. A PPI image of the bottom Z covering a large area around the ship is then displayed on the indicator as shown in FIG. 11.

In a modified form of the embodiment, the receiving beam may be steered to scan a single-sided bottom area as shown in FIG. 12. The transducer should however be rotated 360 degrees around the ship to produce a full-circle PPI image.

Although the above embodiment determines bottom depths by detecting echo peaks, it is also possible to provide a discriminator for discriminating between echo data of the bottom and mid-water objects by setting a sampling depth range. The underwater detection system according to the another embodiment of the invention is capable of selectively displaying only the mid-water objects G as shown in FIG. 13, or a combination of the bottom Z and mid-water objects G with the bottom Z in the background as shown in FIG. 14, for instance.

In one aspect of the embodiment, the bottom Z shown in FIG. 11 and the mid-water objects G shown in FIG. 13 are painted in different colors or in different shades of a single color in accordance with their echo signal levels or depth information contained in the echo signals. FIGS. 11 and 13 individually show a color bar H illustrating depth or echo level gradation at the lower-right corner of the indicator screen. In a case where the mid-water objects 6 and bottom Z are displayed together as shown in FIG. 14, the mid-water objects G are displayed in different colors in accordance with their echo signal levels and the bottom in different shades of a single color in accordance with depth information contained in the echo signals to provide an easy-to-understand presentation.

In another aspect of the embodiment, a vertical cross section F passing through echoes of the mid-water objects G is displayed in addition to a plan view E, as shown in FIG. 14. This form of combination display provides easy recognition of positional relationships between the bottom Z and mid-water objects G.

In another preferred embodiment of the invention, an underwater detection system which can search a large area around a ship comprises a transducer for transmitting ultrasonic waves in all directions around the ship and producing a receiving beam which is rotated for receiving echoes all around the ship at varying tilt angles; a tilt angle setting data generator which generates tilt angle data $(\theta_1, \theta_2, \ldots \theta_n)$ in first n rotations of the receiving beam, tilt angle data $(\theta_1', \theta_2', \ldots \theta_n')$ in second n rotations of the receiving beam, tilt angle data $(\theta_1'', \theta_2'', \ldots \theta_n'')$ in third n rotations of the receiving beam, and so forth for varying the tilt angle $\theta$ of the receiving beam in incremental steps to perform three-dimensional underwater sounding in such a manner that the receiving beam scans search points of same depths at respective tilt angles in each horizontal direction $\phi$; and an indicator for displaying a plan view of the area of search based on echo signals obtained for individual depths in such scanning sequences.

According to this embodiment, the underwater detection system employs a cylindrical array type transducer as shown in FIG. 1. Each time the receiving beam B is rotated along the curved surface of a circular cone, its tilt angle $\theta$ is slightly increased. The tilt angle $\theta$ is increased stepwise each successive rotation of the receiving beam B as shown in FIG. 15 to scan not only horizontally but also vertically. The underwater sounding apparatus performs three-dimensional soundings in this scanning method. Dashed lines with arrows in FIG. 15 illustrate traces of search points of the receiving beam B cut by a vertical plane.

FIG. 16 is a detailed vertical cross section of the receiving beam scanning pattern of FIG. 15. It is now assumed that the tilt angle $\theta$ is altered in just two steps between $\theta_1$ and $\theta_2$ for the convenience of explanation. In this case, the receiving beam B picks up echoes from search point $P_{11}$ with tilt angle $\theta_1$ in its first rotation and from search point $P_{12}$ with tilt angle $\theta_2$ in its second rotation. It is noted from FIG. 16 that the length $QP_{12}$ is larger than the length $QP_{11}$. This is due to the time needed by the receiving beam B to complete a 360-degree rotation. The receiving beam B scans search points $P_{21}$ (tilt angle $\theta_1$), $P_{22}$ (tilt angle $\theta_2$) and so forth following search point $P_{12}$.

As seen from FIG. 16, search points $P_{11}$ and $P_{21}$ are located at different depths although they lie at the same tilt angle. This causes inconvenience in providing a three-dimensional presentation from underwater sounding data. To avoid this inconvenience, the receiving beam tilt angle is actually set to $\theta_1'$ so that search point $P_{21}'$ at the beginning of a second vertical search cycle is located at the same depth as search point $P_{11}$, where $QP_{21}=QP_{21}'$. Similarly, the receiving beam tilt angle is set to $\theta_2'$ so that search point $P_{22}'$ at the end of a second vertical search cycle is located at the same depth as search point $P_{12}$, where $QP_{22}=QP_{22}'$.

Preferably, echo data picked up from search points $P_{11}$ and $P_{21}'$ of the same depth are stored in a first depth layer memory, echo data picked up from search points $P_{12}$ and $P_{22}'$ of the same depth are stored in a second depth layer memory, and so forth. Also, echo data picked up from search points $P_{11}$ and $P_{12}$ are written in a common address of the first and second depth layer memories on the assumption that these search points are located on the same vertical line, echo data picked up from search points $P_{21}'$ and $P_{22}'$ are written in a common address of the first and second depth layer memories, and so forth, for the convenience of three-dimensional presentation.

Also in this embodiment, the bottom of water and mid-water objects are displayed in different colors or in different shades of monochrome gradation in accordance with their echo signal levels or depth information.

These and other objects, features and advantages of the invention will be more readily understood upon reading the detailed description of the invention.

DETAILED DESCRIPTION OF THE PREFERRED EMBODIMENTS OF THE INVENTION

Figure 17:
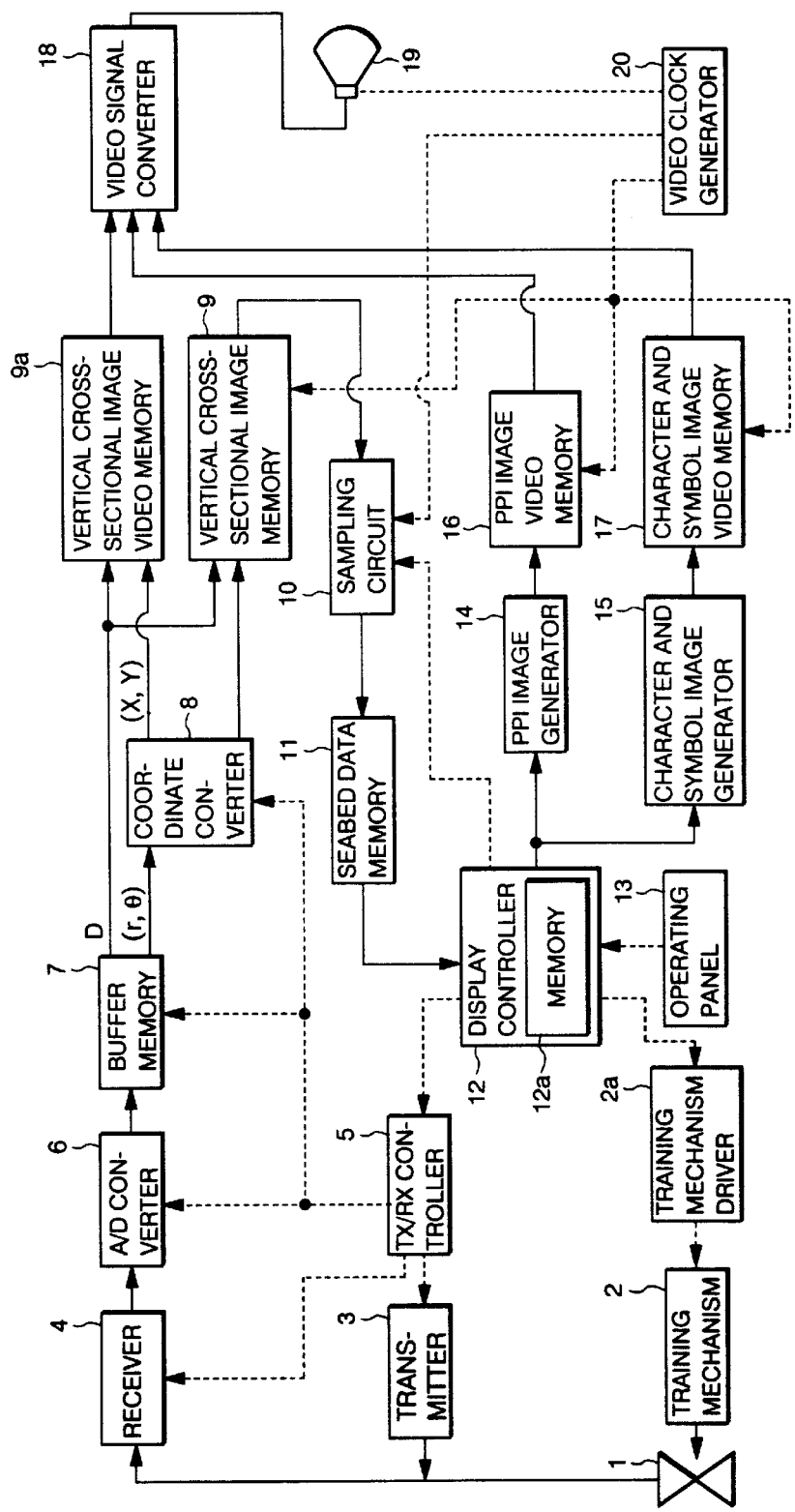
FIG. 17 is a block diagram of the underwater detection system according to the first embodiment of the invention.
Figure 18:
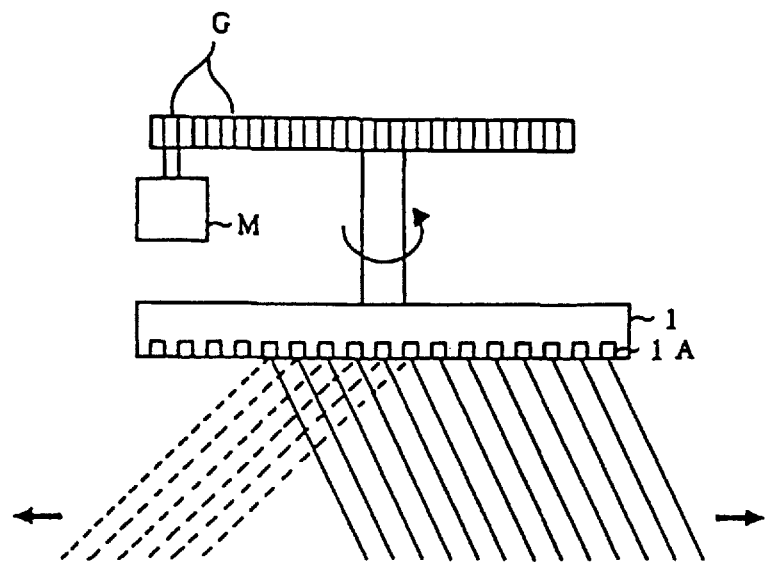
FIG. 18 is a diagram showing a transducer and its mechanical training mechanism employed in the underwater detection system of FIG. 17.
Figure 19:
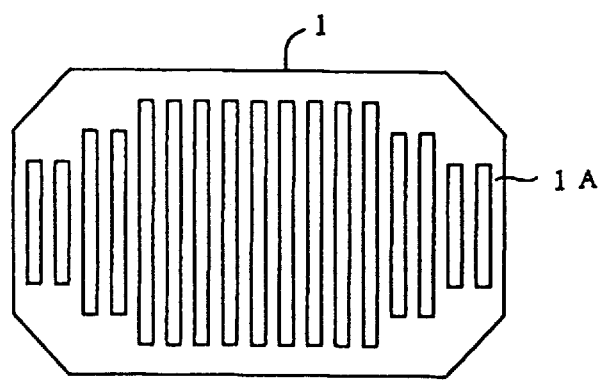
FIG. 19 is a plan view of the transducer shown in FIG. 18.

FIG. 17 is a block diagram of an underwater sounding apparatus according to a first embodiment of the invention, in which designated by the numeral 1 is a transducer 1 for transmitting and receiving ultrasonic waves. FIG. 18 is a diagram showing the transducer 1 and its mechanical training mechanism 2. The transducer 1 has a generally rectangular surface on which a plurality of transducer elements 1A is arranged to form a linear array as shown in FIG. 19. The transducer 1 is rotated by training mechanism including a motor M and a reduction gear G. When receiving echo signals, adjacent transducer elements 1A of the array are successively given constant time delays or phase differences so that received signal phases of the individual transducer elements 1A align each other with regard to echoes from a particular direction. This means that the transducer 1 as a whole forms a receiving beam pointing in that particular direction. It should be noted that the receiving beam can be moved within a vertical fan-like area in the direction of the array of the transducer elements 1A, passing through a vertical line extended exactly downward from the transducer 1, by continuously varying the amount of time delay.

In FIG. 17, designated by the numeral 2a, is a training driver for driving the motor M, and designated by the numeral 3 is a transmitter for feeding drive signals to the individual transducer elements 1A of the transducer 1 each transmission cycle. These drive signals cause the transducer 1 to form an ultrasonic beam having a wide directional characteristics. Designated by the numeral 4 is a receiver which amplifies and detects echo signals received by the transducer 1 and gives a specified amount of time delay to detected signals derived from the individual transducer elements 1A to perform electronic scanning of the receiving beam. Designated by the numeral 5 is a transmit/receive controller for controlling operation of both the transmitter 3 and receiver 4.

An output signal of the receiver 4 is converted from analog to digital form by an analog-to-digital (A/D) converter 6 and a resultant digital signal is stored in a buffer memory 7. Designated by the numeral 8 is a coordinate converter for converting data $D(r, \theta)$ expressed in polar coordinates into data $D(X, Y)$ expressed in rectangular coordinates. Data converted by the coordinate converter 8 is stored in a vertical cross-sectional image memory 9 and a vertical cross-sectional image video memory 9a. The A/D converter 6, buffer memory 7 and coordinate converter 8 operate in synchronism with a clock signal delivered from the transmit/receive controller 5.

When echo data for one complete cross section has been stored in the vertical cross-sectional image memory 9, a sampling circuit 10 reads out data of one vertical line after another downward from the vertical cross-sectional image memory 9 and detects a peak value (which corresponds to a seabed echo) in each vertical line. Designated by the numeral 11 is a seabed data memory for memorizing depth addresses where the sampling circuit 10 has detected peak values.

Designated by the numeral 12 is a display controller which transmits various kinds of setup data including the choice of a training sector angle and a depth range to the transmit/receive controller 5, a sampling depth range to the sampling circuit 10 in accordance with data on various operator settings concerning on-screen presentation entered via an operating panel 13. The display controller 12 also transmits depth data received from the seabed data memory 11 to a PPI image generator 14, and signals to be used for presentation of characters and graphics symbols on an indicator 19 to a character and symbol image generator 15. The display controller 12 contains a memory 12a for storing the aforementioned setting data. Designated by the numeral 16 is a PPI image video memory for storing PPI image display data generated by the PPI image generator 14, and designated by the numeral 17 is a character and symbol image video memory for storing character and symbol image data generated by the character and symbol image generator 15.

Video signals outputted from the vertical cross-sectional image video memory 9a, PPI image video memory 16 and character and symbol image video memory 17 are delivered to a video signal converter 18. The video signal converter 18 combines and converts these video signals into a signal for producing different colors (or shades of monochrome gradation) in accordance with water depths. Designated by the numeral 20 is a video clock generator which transmits a clock signal to the vertical cross-sectional image video memory 9a, PPI image video memory 16 and character and symbol image video memory 17.

Operation of the underwater sounding apparatus thus constructed is now described with reference to a flowchart shown in FIG. 20.

Figure 21:
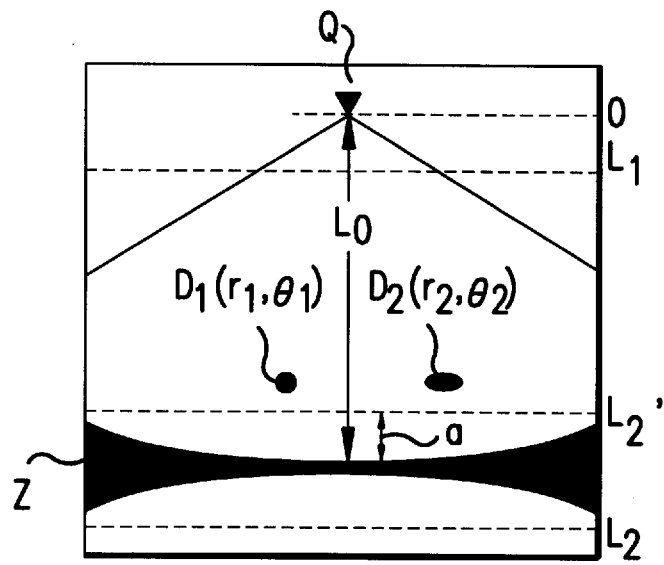
FIG. 21 is a diagram showing an underwater situation searched by the transducer of FIG. 17 in a single scanning operation.

First, an operator performs initial settings including the choice of a depth range $L_1$–$L_2$ (where $L_1$ and $L_2$ determines upper and lower limits of the depth range, respectively) and a stepwise training angle of the transducer 1 on the operating panel 13 in step S1. If it is desired to detect seabed echoes, the lower limit $L_2$ is set to a value larger than approximately known depth $L_0$ of the seabed Z, as shown in FIG. 21. In step S3 which follows step S1, the transducer 1 transmits ultrasonic waves into a wide area. In step S4, the receiving beam is caused to scan a fan-like area passing through a vertical line extended exactly downward from the ship Q so that echoes are received from this fan-like area as shown in FIG. 21. Echoes are sequentially received in this scanning operation and resultant echo data D, which is converted from polar coordinate format (r, θ) into rectangular coordinate format (X, Y) by the coordinate converter 8, is stored in both the vertical cross-sectional image memory 9 and vertical cross-sectional image video memory 9a in step S5. When echo data for one vertical cross-sectional area has been fully stored in the vertical cross-sectional image memory 9, the operation flow proceeds to step S6.

Figure 22:
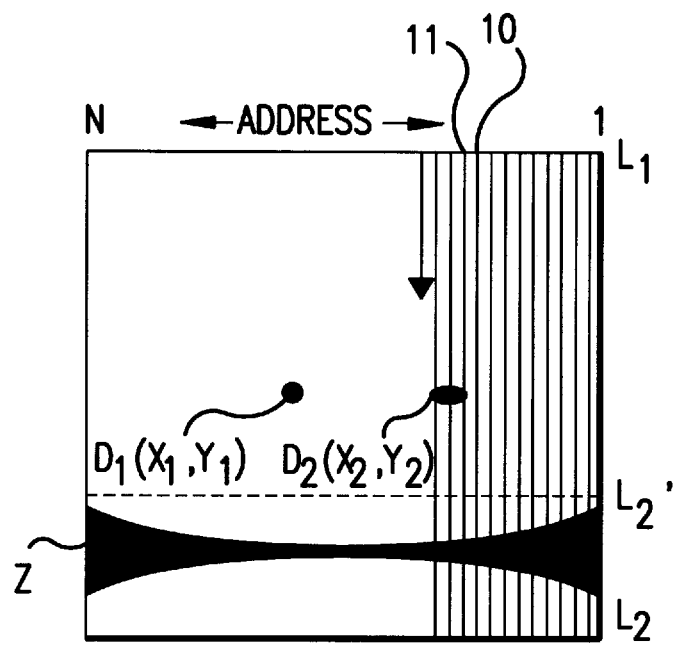
FIG. 22 is a diagram showing how data stored in a vertical cross-sectional image memory of FIG. 17 is read out.

FIG. 22 is a diagram depicting data contents of the vertical cross-sectional image memory 9 which has a two-dimensional address map configuration. In step S6, the sampling circuit 10 sequentially reads out data from the vertical cross-sectional image memory 9 for one vertical line at a time in a downward direction (vertical direction in FIG. 22) starting from address 1. In step S7, a seabed depth is determined based on detection timing of an echo data peak value in each vertical line. In the example shown in FIG. 22, peak values detected from addresses 1 through 10 come all from the seabed Z. When address 11 is reached, echo data $D_2$ of a fish school will be detected in addition to an echo of the seabed Z. However, a peak value will be taken from the echo of the seabed Z because its level is higher than the level of the fish echo. Seabed depths determined in this manner are stored in the seabed data memory 11 in step S8.

When the data contents of all the vertical lines have been read out from the vertical cross-sectional image memory 9 (YES in step S9), the operation flow proceeds to step S10, in which a fractional PPI image depicting seabed depths derived from echo data of one vertical cross section is displayed on the indicator 19 in different colors (or in shades of monochrome gradation). When an area $S_1$ shown in FIG. 10 has just been scanned, for instance, seabed depth information for this narrow two-sided fan-like area $S_1$ is displayed on the indicator 19 as illustrated in FIG. 10.

Figure 10:
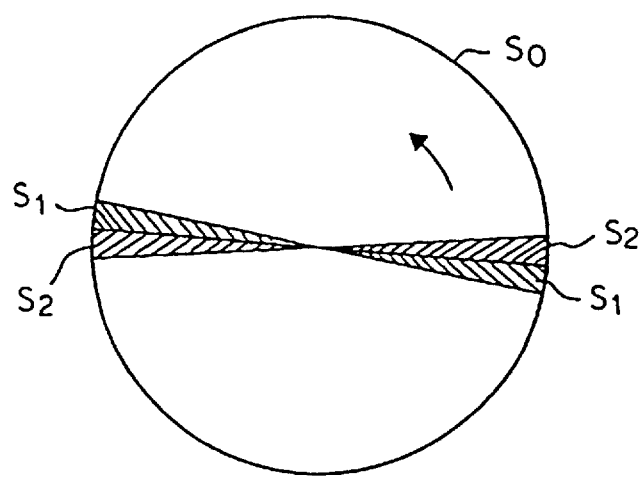
FIG. 10 is a diagram showing area segments swept by the linear array type transducer of FIG. 9 when it is trained in a horizontal plane.

When seabed depth in formation for one vertical cross section has been displayed, the operation flow returns to step S2, in which the transducer 1 is rotated in a horizontal plane by a specified angle of stepwise training so that the receiving beam covers an adjacent area $S_2$ shown in FIG. 10. The above-described sequence of steps S2 to S11 is carried out repeatedly until a full-circle PPI image of the seabed Z covering a large area around own ship Q as shown in FIG. 11 is completed.

Figure 11:
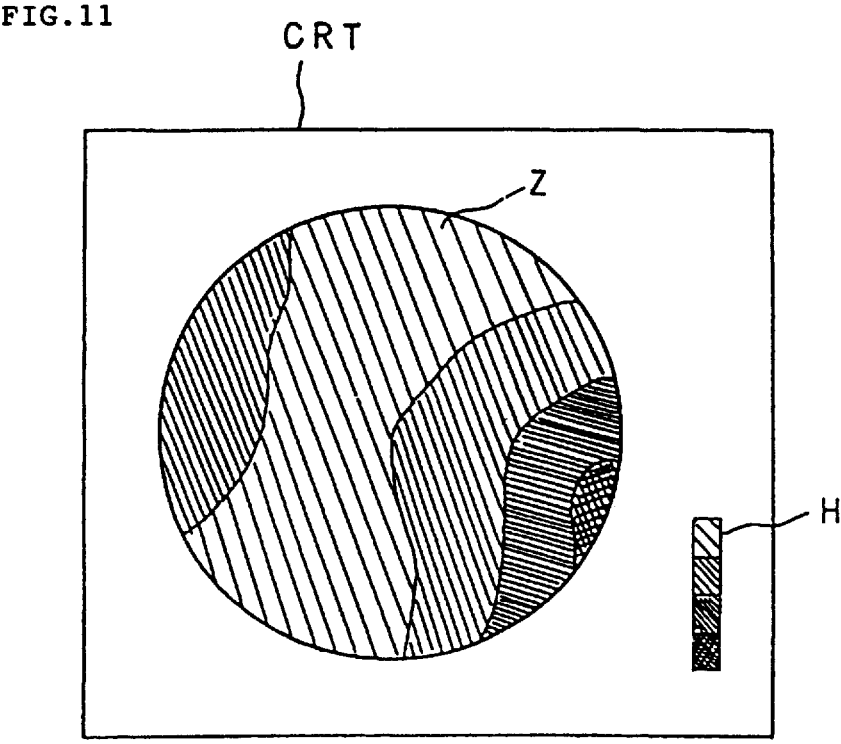
FIG. 11 shows a display example of seabed information obtained by an underwater detection system according to a first embodiment of the invention.
Figure 12:
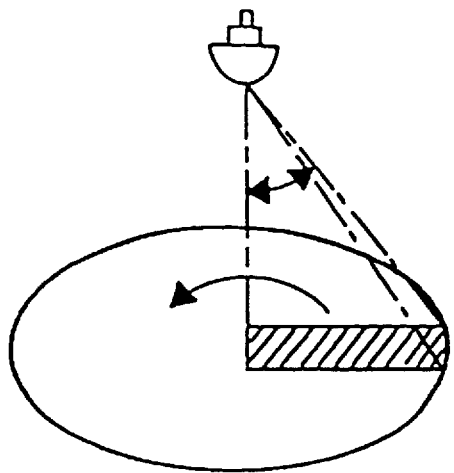
FIG. 12 is a diagram showing a modified form of scanning pattern illustrated in FIG. 9.
Figure 14:
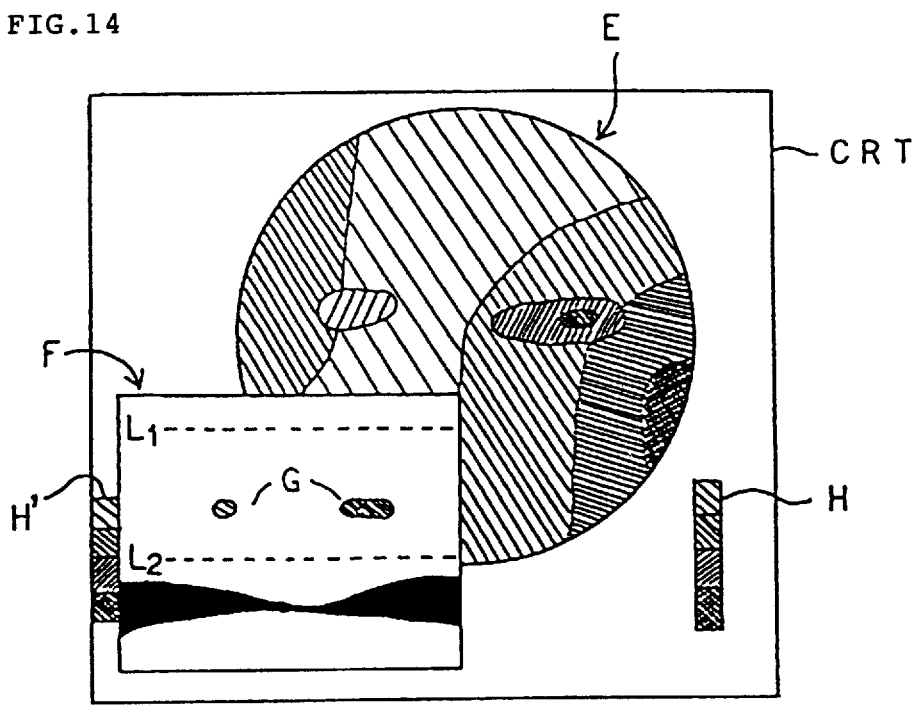
FIG. 14 shows an example of combination display in which a vertical cross-sectional image is presented in addition to a PPI image of a seabed and fish schools.
Figure 15:
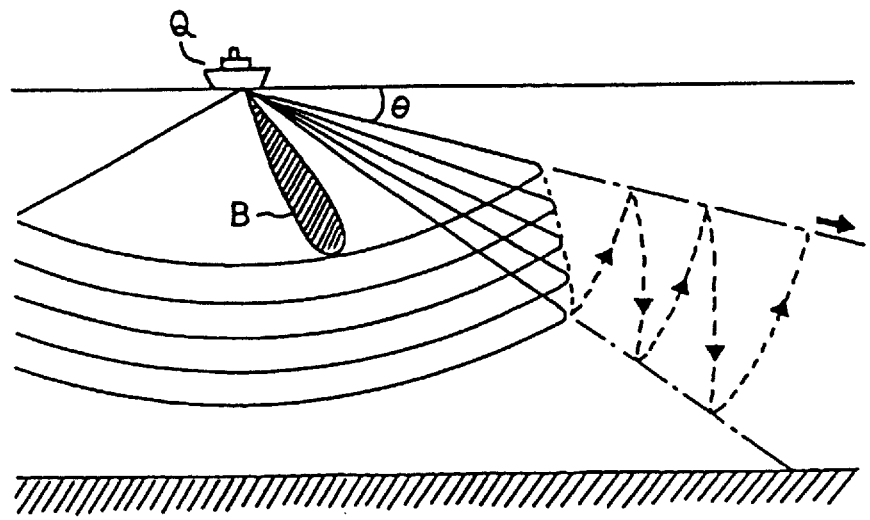
FIG. 15 is a diagram showing a scanning pattern of a receiving beam formed in the second embodiment of the invention.

It should be pointed out that the full-circle PPI image of FIG. 11 does not allow the operator to observe fish schools. A combination display as shown in FIG. 14 makes up for this drawback. In combination display mode, a vertical cross-sectional image F delivered directly from the vertical cross-sectional image video memory 9a to video signal converter 18 is displayed together with a PPI image E so that positional relationships between the seabed Z and fish schools G can be readily recognized. In FIG. 14, the fish schools G in the vertical cross-sectional image F are painted in colors shown in a color bar H. The vertical cross-sectional image F may be either a cross section taken in a desired direction or a cross section produced from the latest echo data.

Figure 13:
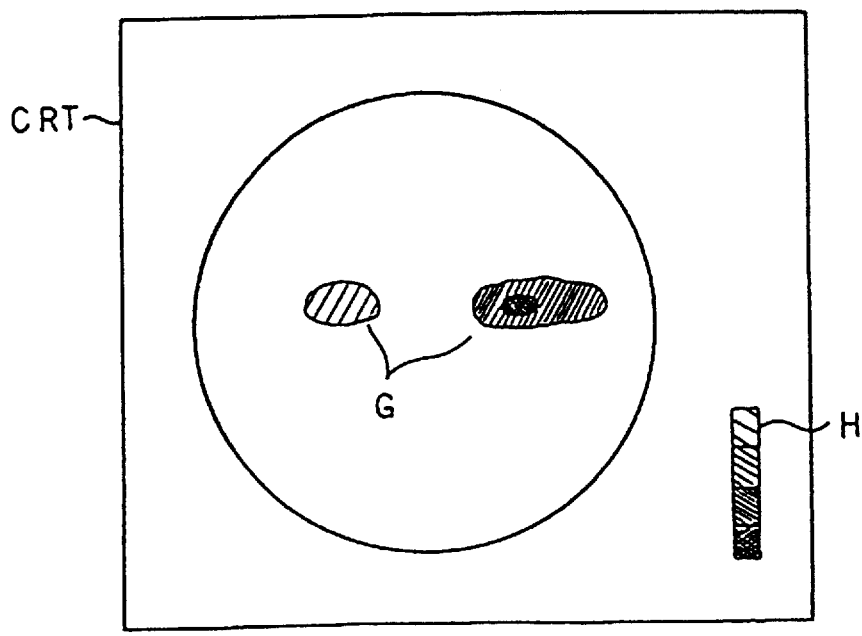
FIG. 13 shows a display example of fish school information obtained by the underwater detection system according to the first embodiment of the invention.

In the above embodiment, the lower limit $L_2$ of the depth range is set to a value larger than the approximate seabed depth $L_0$ in step S1. Referring to FIG. 21, if the lower limit $L_2$ is set to $L_2'$ which is smaller than $L_0$, data is read out only from depth range $L_1$–$L_2'$ in the echo data readout process depicted in FIG. 22. In this case, peak values are taken from echoes of mid-water fish schools G and the seabed data memory 11 memorizes depth data of the fish schools G. The indicator 19 therefore displays a PPI image of the fish schools G in different colors (or in shades of monochrome gradation) in accordance with their depths as shown in FIG. 13. In this embodiment, the seabed data memory 11 may store echo data peak levels so that the fish schools 6 are shown in different colors (or in shades of monochrome gradation) in accordance with their echo levels.

Since only the fish schools G are shown in the PPI image of FIG. 13, it is impossible to recognize their positions relative to the seabed Z If a vertical cross-sectional image F, like the one shown in FIG. 14, is displayed together with the PPI image of FIG. 13, the operator can recognize positional relationships between the seabed Z and fish schools G.

Figure 23:
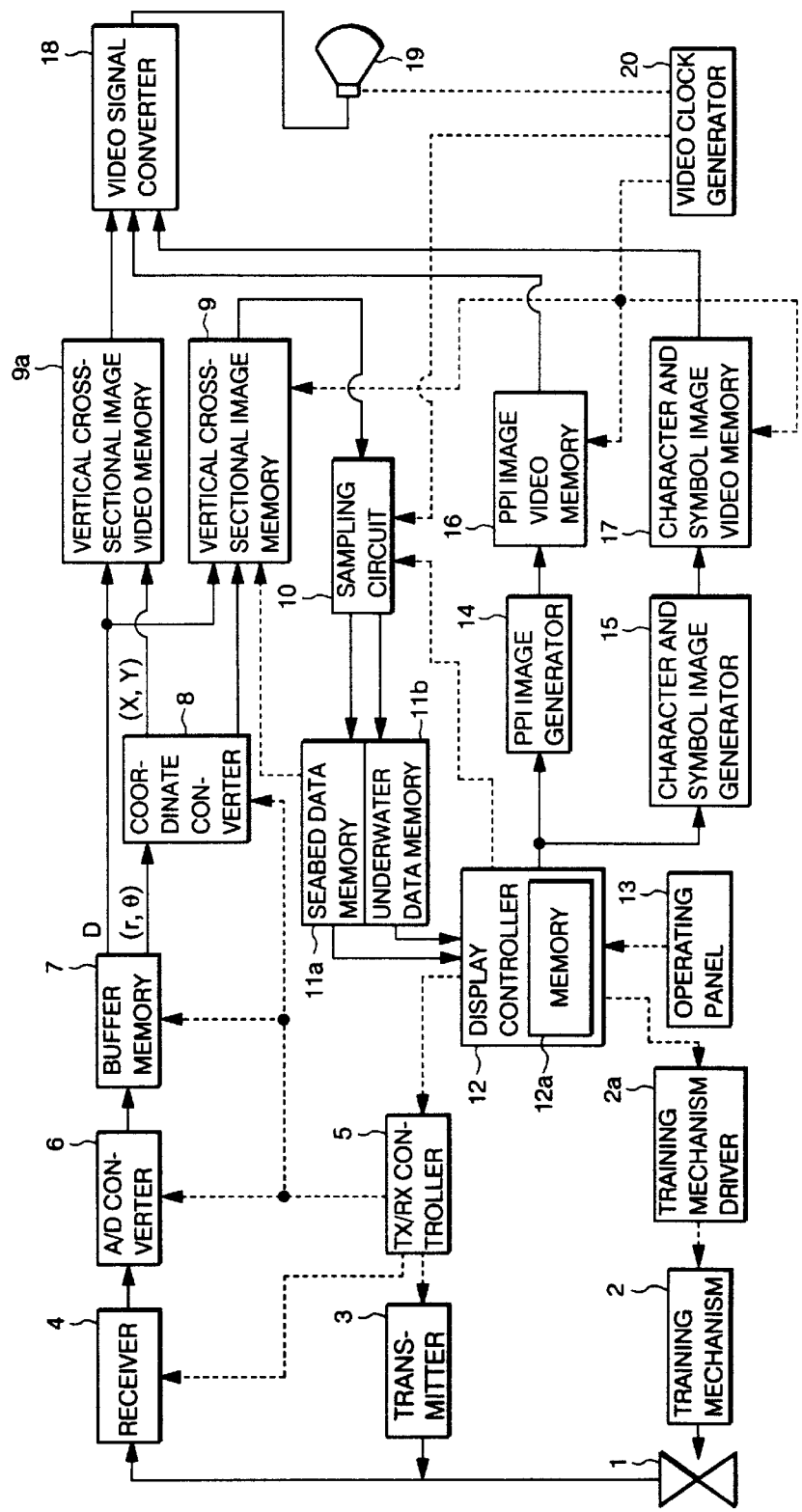
FIG. 23 is a block diagram of an underwater sounding apparatus according to one variation of the first embodiment of the invention.

As seen above, the operator should know the approximate seabed depth $L_0$ in advance for displaying fish schools only using the underwater sounding apparatus of FIG. 17. FIG. 23 is a block diagram of an underwater sounding apparatus according to one variation of the first embodiment of the invention, which automatically discriminates between seabed and fish echoes and enables the operator to choose whether to display seabed data only, fish school data only, or a combination of both. The underwater sounding apparatus of FIG. 23 is provided with a seabed data memory 11A for storing depths of echo data peaks and an underwater data memory 11B for storing echo data peak values instead of the seabed data memory 11.

Figure 20:
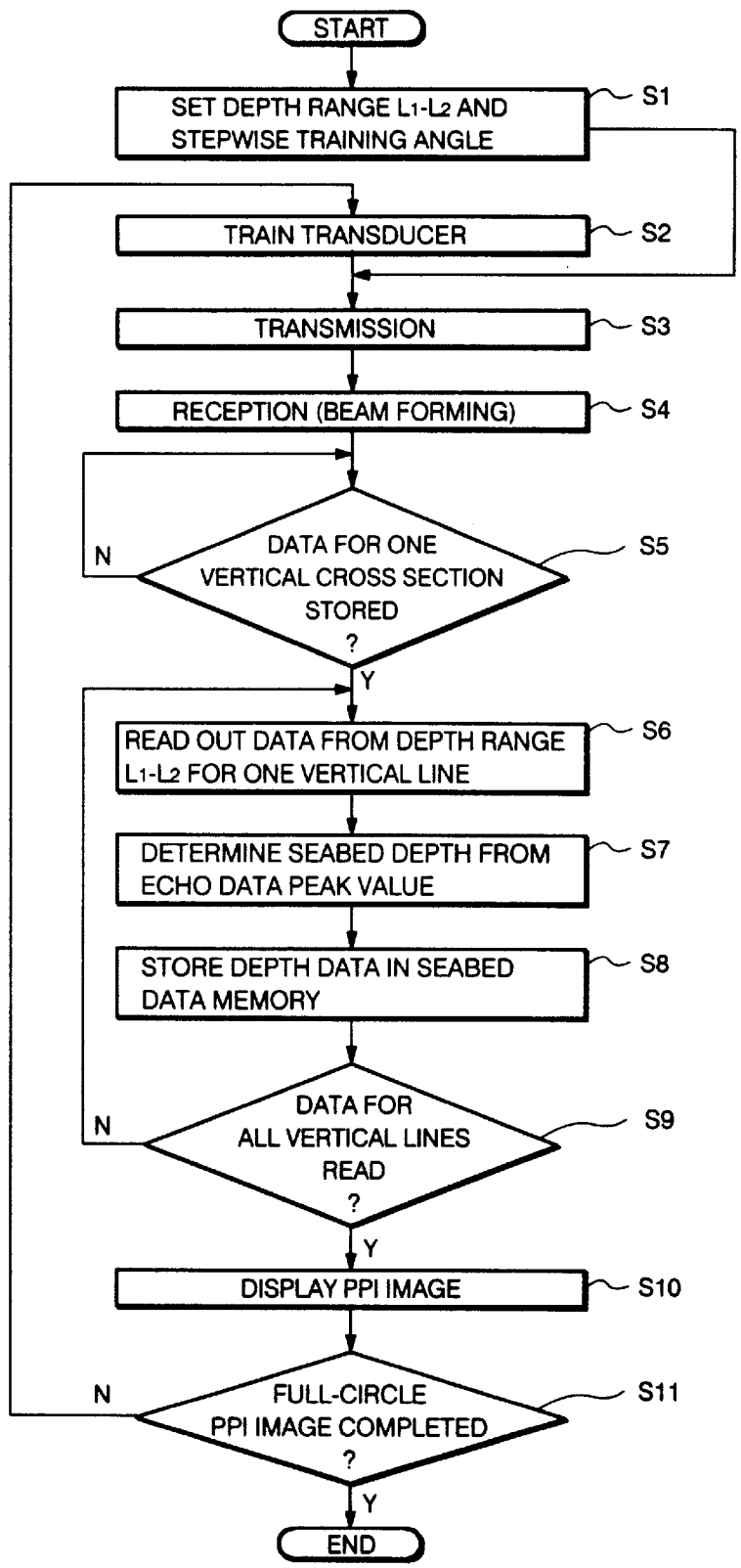
FIG. 20 is a flowchart showing an operational sequence of the underwater sounding apparatus of FIG. 17.

The flowchart of FIG. 20 can be used without any changes if it is desired to display seabed data only on the underwater sounding apparatus of FIG. 23. Operation of the underwater sounding apparatus of FIG. 23 for displaying fish school data only is now described with reference to flowcharts shown in FIGS. 24 and 25.

First, the operator performs initial settings including the choice of a depth range $L_1$–$L_2$ to be surveyed and a stepwise training angle of the transducer 1 on the operating panel 13 in step S21. In step S22, it is judged whether seabed depth $L_0$ has already been determined. If the judgment result is in the negative, the operation flow proceeds to a subroutine of step S23 for determining the seabed depth $L_0$. A detailed operational sequence of the subroutine is shown in a flowchart of FIG. 25.

Figure 25:
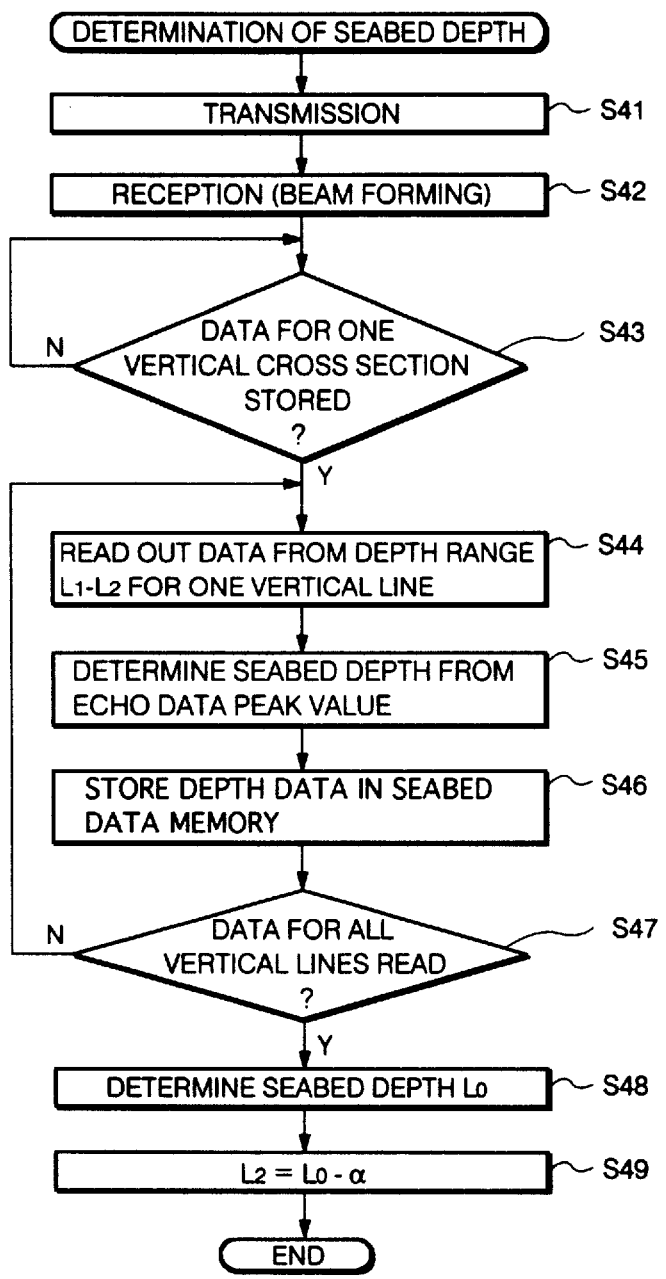
FIG. 25 is a flowchart showing details of a seabed depth determination subroutine of FIG. 24.

In step S41 of FIG. 25, the transducer 1 transmits ultrasonic waves. When echo data for one vertical cross section obtained in step S42 has been fully stored in the vertical cross-sectional image memory 9, the operation flow proceeds from step S43 to step S44. The sampling circuit 10 sequentially reads out data from the vertical cross-sectional image memory 9 for one vertical line at a time within the depth range $L_1$–$L_2$ in step S44 and a seabed depth in each vertical line is determined based on timing to detect an echo data peak value in step S45. The seabed depth determined in this manner is stored in the seabed data memory 11A in step S46. When the data contents of all the vertical lines have been read out from the vertical cross-sectional image memory 9 (YES in step S47), the operation flow proceeds to step S48, in which the seabed depth $L_0$ just beneath the ship Q is determined. In step S49, the lower limit $L_2$ of the depth range is set to $L_2 = L_0 - \alpha = L_2'$, where a is α constant chosen so as not to read out echo data of the seabed Z of which apparent echo is vertically extended away from the ship Q as shown in FIG. 21. In a cross-sectional image, the seabed is painted longer in vertical directions farther away from the ship Q because the receiving beam becomes more inclined and progressively wider at longer distances, causing the seabed to appear at shallower positions than its true depth.

Figure 24:
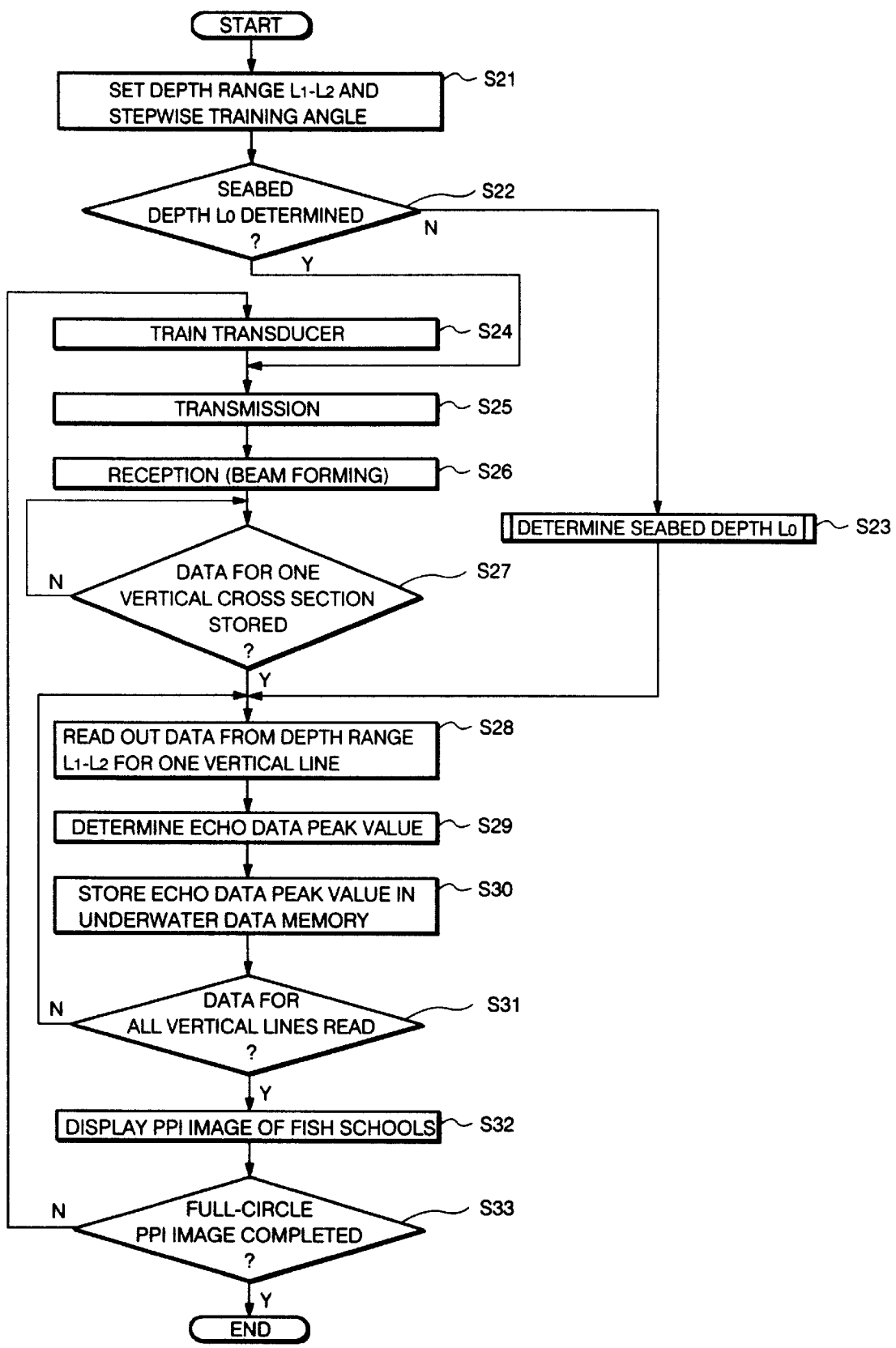
FIG. 24 is a flowchart showing an operational sequence for displaying a PPI image of fish schools only with the underwater sounding apparatus of FIG. 23.

The operation flow proceeds from step S49 to step S28 of FIG. 24. In step S28, echo data stored in the vertical cross-sectional image memory 9 is read out for one vertical line at a time. Because the depth range is set to $L_1$–$L_2'$ at this point, the echo data read out from the vertical cross-sectional image memory 9 is that of mid-water objects only, excluding the seabed Z. A peak value of the echo data is determined in step S29 and stored in the underwater data memory 11B in step S30.

When the data contents of all the vertical lines have been read out from the vertical cross-sectional image memory 9 (YES in step S31), the operation flow proceeds to step S32, in which a fractional PPI image depicting fish school echo levels derived from echo data of one vertical cross section is displayed on the indicator 19 in different colors or in shades of monochrome gradation. At this point, the operation flow returns to step S24, in which the transducer 1 is rotated in a horizontal plane by a specified angle of stepwise training so that the receiving beam covers an adjacent area. The sequence of steps S24 to S33 is carried out repeatedly until a full-circle PPI image is completed.

When fish schools are displayed in different colors or in shades of monochrome gradation in accordance with their echo levels, the operator cannot recognize depths of the fish schools. To provide depth information, a vertical cross-sectional image F, produced in a direction containing fish echoes, may be displayed together with the PPI image, as shown in FIG. 14. It will also be possible to display fish schools with depth information if depths of echo data peaks are stored in the underwater data memory 11B.

Figure 26:
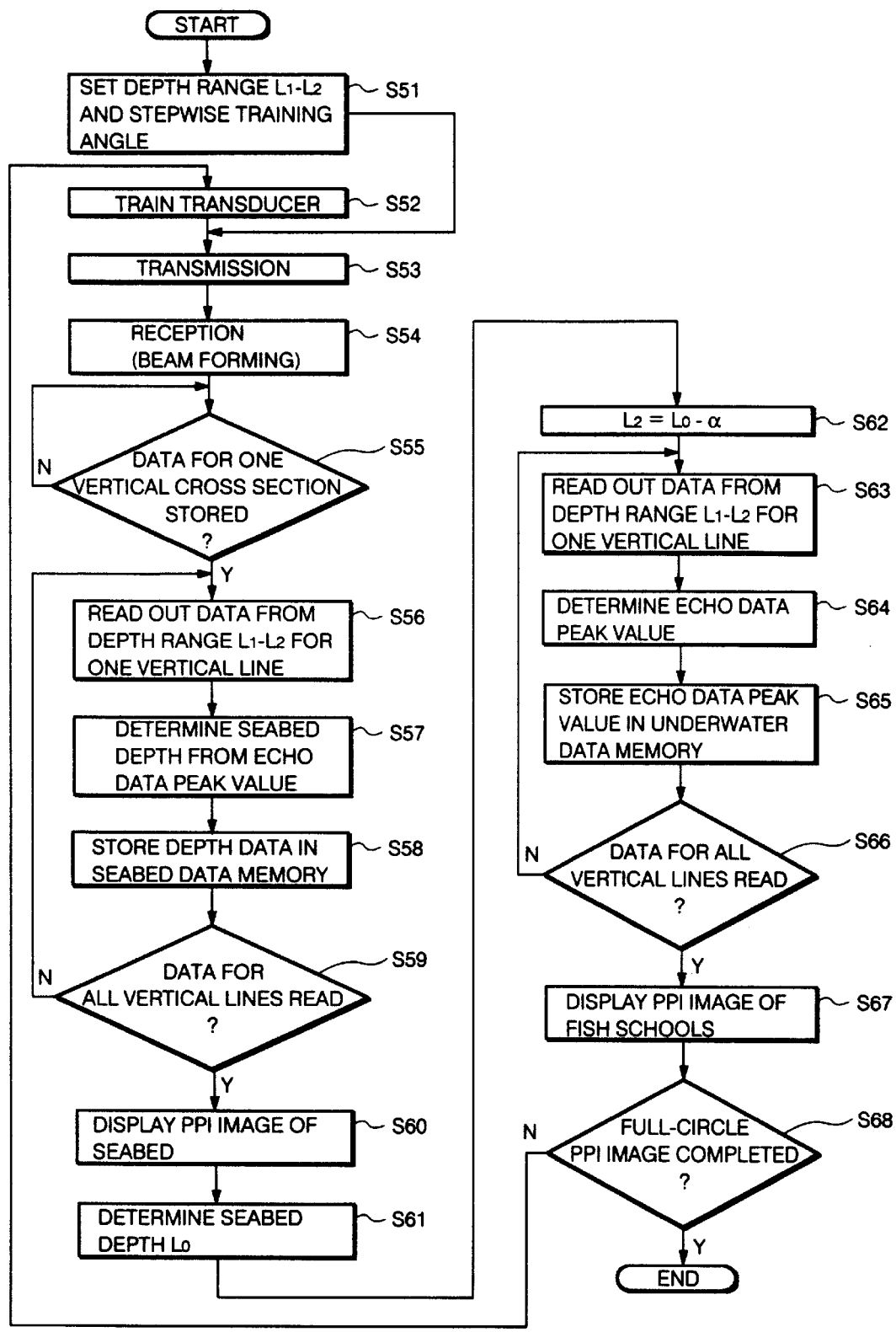
FIG. 26 is a flowchart showing an operational sequence for displaying a PPI image of both seabed and fish echoes on the underwater sounding apparatus of FIG. 23.

Operation of the underwater sounding apparatus of FIG. 23 for displaying a combined PPI image of the seabed and fish school is now described with reference to a flowchart shown in FIG. 26.

First, the operator performs initial settings including the choice of a depth range $L_1$–$L_2$ to be surveyed and a stepwise training angle of the transducer 1 on the operating panel 13 in step S51. In step S53, the transducer 1 transmits ultrasonic waves. When echo data for one vertical cross section obtained in step S54 has been fully stored in the vertical cross-sectional image memory 9, the operation flow proceeds from step S55 to step S56. The sampling circuit 10 sequentially reads out data from the vertical cross-sectional image memory 9 for one vertical line at a time within the depth range $L_1$–$L_2$ in step S56 and a seabed depth in each vertical line is determined based on detection timing of an echo data peak value in step S57. The seabed depth determined in this manner is stored in the seabed data memory 11A in step S58. When the data contents of all the vertical lines have been read out from the vertical cross-sectional image memory 9 (YES in step S59), the operation flow proceeds to step S60, in which a fractional PPI image depicting seabed depths derived from echo data of one vertical cross section is displayed on the indicator 19. In step S61, the seabed depth $L_0$ just beneath own ship Q is determined based on the seabed depth data. In step S62, the lower limit $L_2$ of the depth range is set to $L_2 = L_0 - \alpha = L_2'$. In step S63, echo data stored in the vertical cross-sectional image memory 9 is read out again for one vertical line at a time. Because the depth range is set to $L_1$–$L_2'$ at this point, the echo data read out from the vertical cross-sectional image memory 9 is that of mid-water objects only, excluding the seabed Z. A peak value of the echo data is determined in step S64 and stored in the underwater data memory 11B in step S65.

When the data contents of all the vertical lines have been read out from the vertical cross-sectional image memory 9 (YES in step S66), the operation flow proceeds to step S67, in which information on fish school echo levels is displayed over the fractional PPI image depicting seabed depths for one vertical cross section which is already shown on the indicator 19. The operation flow returns from step S68 to step S52, in which the transducer 1 is rotated in a horizontal plane by a specified angle of stepwise training so that the receiving beam covers an adjacent area. The sequence of steps S52 to S68 is carried out repeatedly until a full-circle PPI image is completed.

To facilitate discrimination between the seabed and fish echoes, fish schools may be shown in different colors in accordance with echo levels and the seabed, in monochrome gradation of white, gray and black in accordance with water depths, for example.

Figure 1:
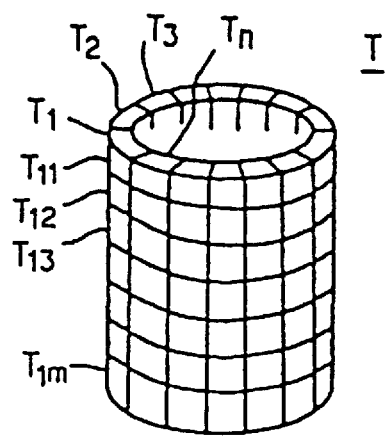
FIG. 1 is a perspective view of a cylindrical array type transducer employed in a second embodiment of the invention.
Figure 2:
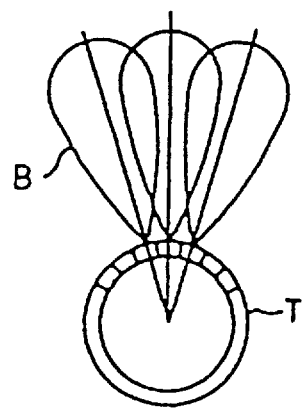
FIG. 2 is a diagram showing receiving beams produced by individual vertical columns of transducer elements.
Figure 3:
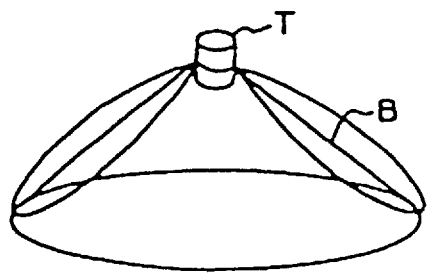
FIG. 3 is a diagram showing a scanning pattern along the curved surface of a circular cone covered by the transducer shown in FIG. 1.
Figure 4:
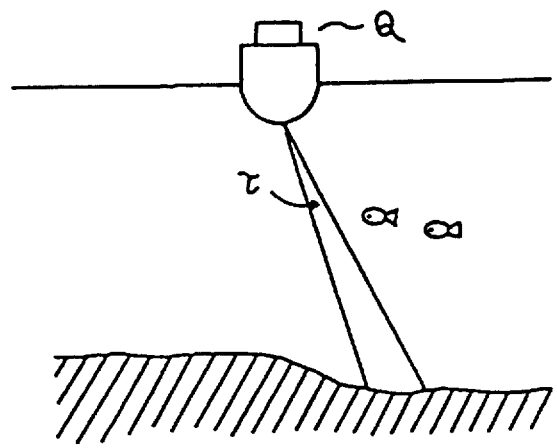
FIG. 4 is a diagram showing a vertical cross section of the scanning pattern shown in FIG. 3.
Figure 5:
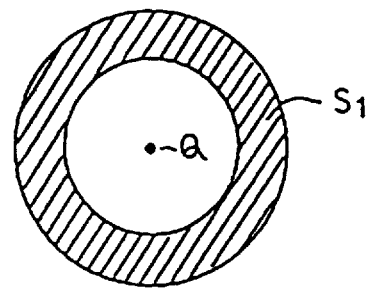
FIG. 5 is a diagram showing a seabed area covered by the scanning pattern shown in FIG. 3.
Figure 6:
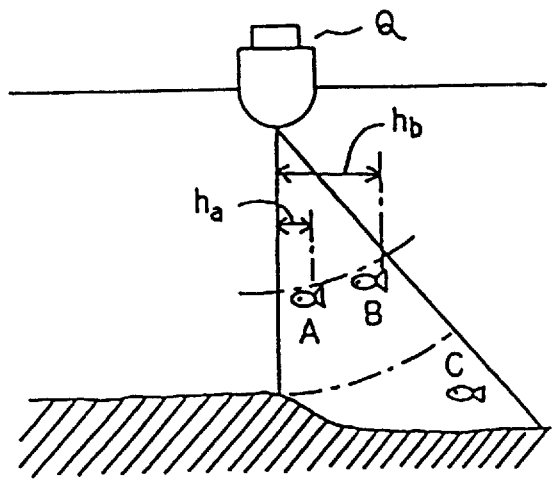
FIG. 6 is a diagram illustrating that certain mid-water objects can not be discriminated from each other when a receiving beam having a wide beam angle is used.
Figure 7:
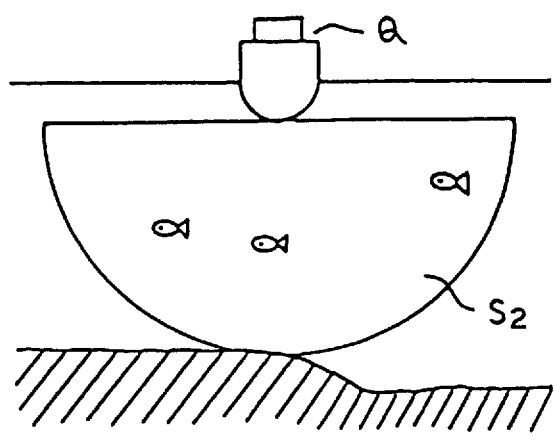
FIG. 7 is a diagram showing a vertical cross-sectional area searched by a transducer.
Figure 8:
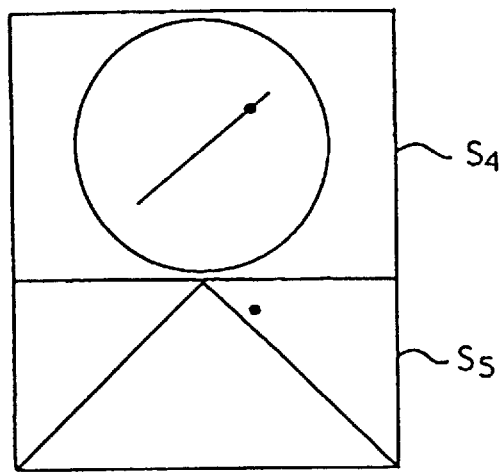
FIG. 8 is a diagram showing an example of conventional presentation on which a plan view and a cross-sectional view are simultaneously displayed.
Figure 9:
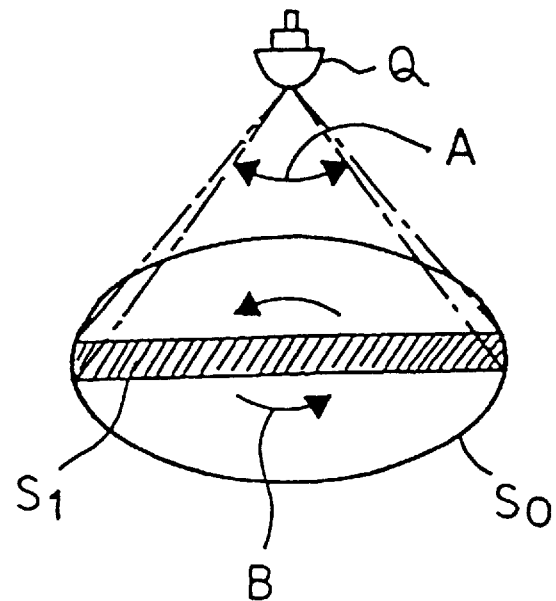
FIG. 9 is a diagram showing a search area scanned by a linear array type transducer which is used in a first embodiment of the invention.
Figure 27:
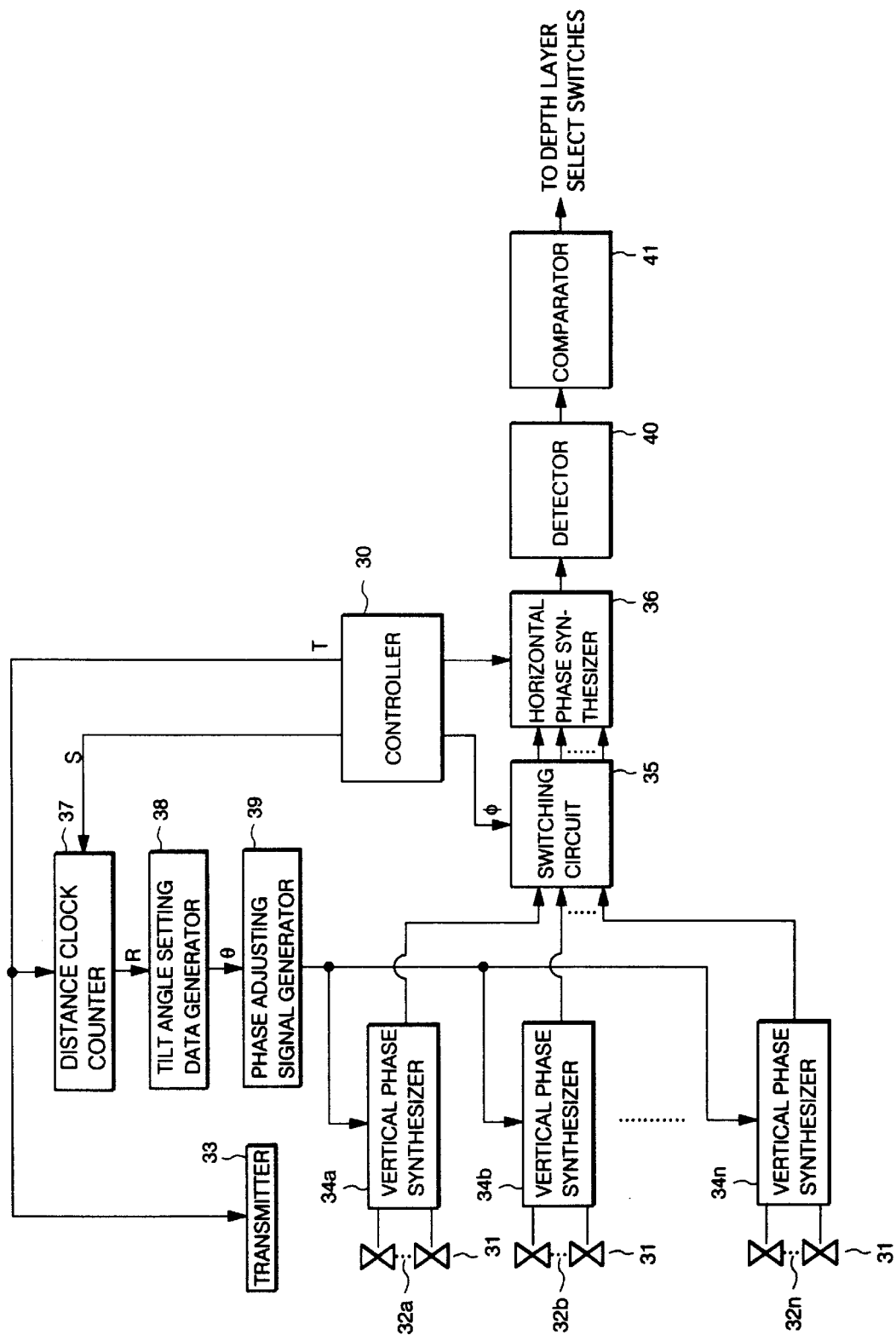
FIG. 27 is a partial block diagram of an underwater sounding apparatus according to the second embodiment of the invention.

FIG. 27 is a partial block diagram of an underwater sounding apparatus according to a second embodiment of the invention. Designated by the numeral 31 is a transducer of the same cylindrical type as shown in FIG. 1. Designated by the numerals 32a to 32n are vertical columns, or "staves," of transducer elements. A plurality of staves are arranged on the cylindrical surface of the transducer 31. A transmitter 33 supplies drive signals to the individual transducer elements to cause them to transmit ultrasonic waves in response to a trigger signal T fed from a controller 30. Designated by the numerals 34a to 34n are vertical phase synthesizers which form receiving beams tipped to a desired tilt angle by giving specified time delays or phase differences to signals received by the individual transducer elements constituting each stave 32 of the transducer 31.

The vertical phase synthesizers 34a–34n produce n receiving beams, each directed at right angles to the side surface of the cylindrical transducer 31 in a horizontal plane and inclined to a desired tilt angle in a vertical plane. Among the n receiving beams, m neighboring receiving beams are selected at a time and operated together to produce a combined receiving beam having a sharp horizontal beam angle and pointing in a desired horizontal direction based on the phase synthesis technique. Designated by the numeral 35 is a switching circuit for sequentially selecting signals outputted from m neighboring vertical phase synthesizers 34. Designated by the numeral 36 is a horizontal phase synthesizer for forming a receiving beam B pointing in a desired horizontal direction at a given tilt angle by aligning phases of m signals selected by the switching circuit 35.

Designated by the numeral 37 is a distance clock counter. This counter 37 increments its count value R each time it receives a train end signal S which is transmitted from the controller 30 upon completion of every 360-degree rotation of the receiving beam B. The count value R transmitted by the distance clock counter 37 is reset when the aforementioned trigger signal T is entered. It is to be noted that the count value R is proportional to the distance to a current search point. Designated by the numeral 38 is a tilt angle setting data generator which generates data on tilt angle θ of the receiving beam B in such a way that the end of the receiving beam B, or the search point, lies at a desired depth with respect to the count value R, as previously discussed with reference to FIG. 16. Designated by the numeral 39 is a phase adjusting signal generator which gives appropriate time delays to the individual vertical phase synthesizers 34 based on the data on tilt angle θ.

Designated by the numeral 40 is a detector for detecting an echo signal picked up by the receiving beam B formed by the horizontal phase synthesizer 36, and designated by the numeral 41 is a comparator which outputs an echo level "1" or "0" depending on whether the detected signal exceeds a specified level. The output of the comparator 41 is sent to depth layer select switches 51.

Figure 28:
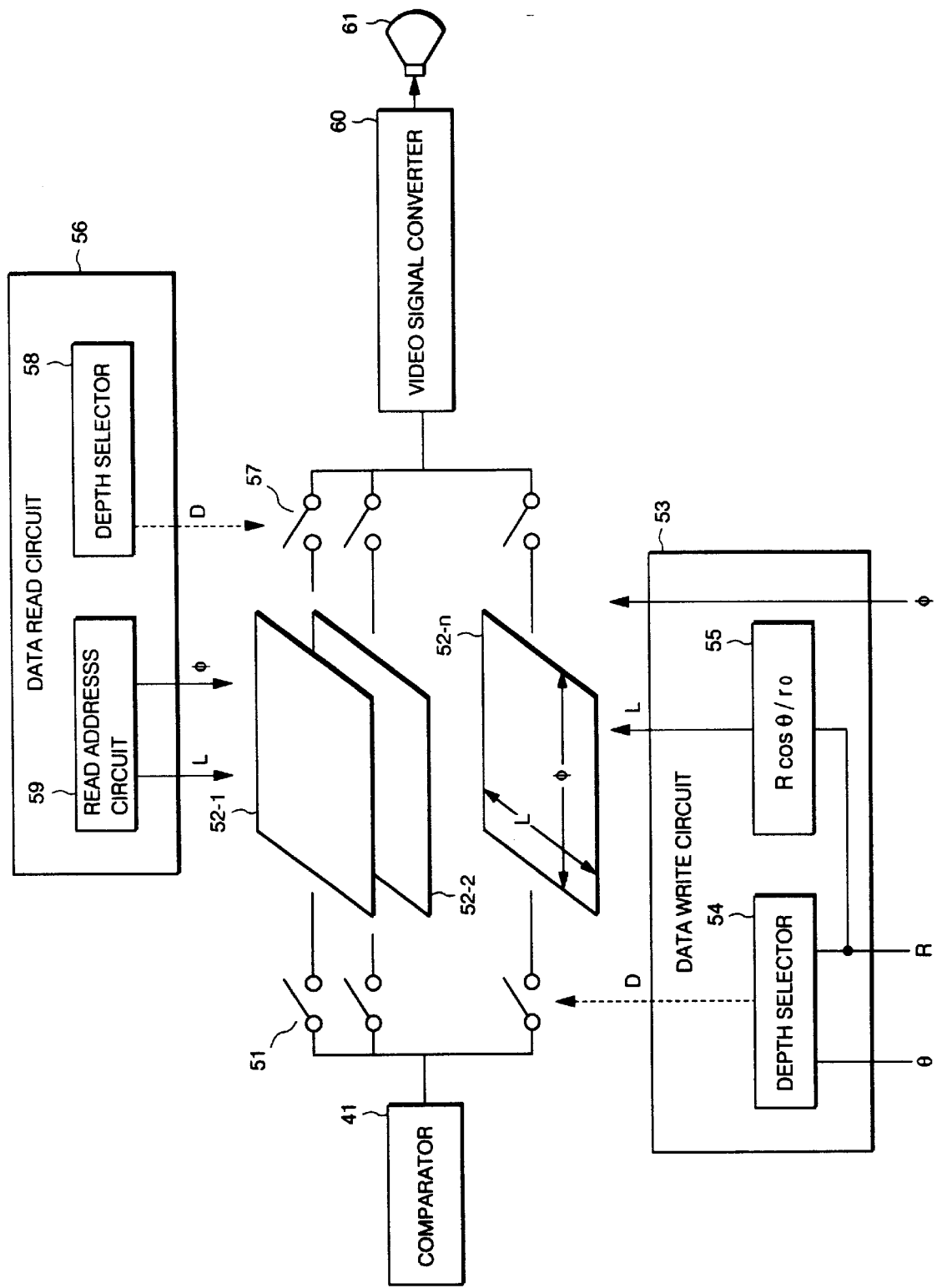
FIG. 28 is a partial block diagram of the underwater sounding apparatus according to the second embodiment of the invention.

Referring to FIG. 28, there are provided n depth layer select switches 51 which are individually connected to depth layer memories 52-1 to 52-n. Designated by the numeral 53 is a data write circuit for controlling a process of writing data into the individual depth layer memories 52. Given the count value R and data on tilt angle θ outputted from the distance clock counter 37 and tilt angle setting data generator 38, respectively, depth D of a current search point is calculated as $D = R \sin \theta$. A depth selector 54 contained in the data write circuit 53 operates one of the depth layer select switches 51 so that a depth layer memory 52 corresponding to the depth D is selected. Designated by the numeral 55 is a horizontal range calculator for calculating horizontal range $L = R \cos \theta / r_0$ to the current search point based on the count value R which represents the distance to the current search point, where $r_0$ is a constant for normalizing values of the horizontal range L. The horizontal range L and a bearing signal f outputted from the controller 30 are used as write address data when writing echo data into the depth layer memories 52.

In FIG. 28, designated by the numeral 56 is a data read circuit for reading echo data of individual depth layers from the depth layer memories 52. The data read circuit 56 comprises a depth selector 58 for controlling depth layer select switches 57 so that the echo data is sequentially read from the bottommost depth layer memory 52-n and a read address circuit 59 for generating read address data including bearings φ and horizontal ranges L in a currently selected depth layer memory 52. The echo data read from the depth layer memories 52 is sent to a video signal converter 60, which converts it into color data in accordance with depths and supplies the color data to an indicator 61.

Figure 16:
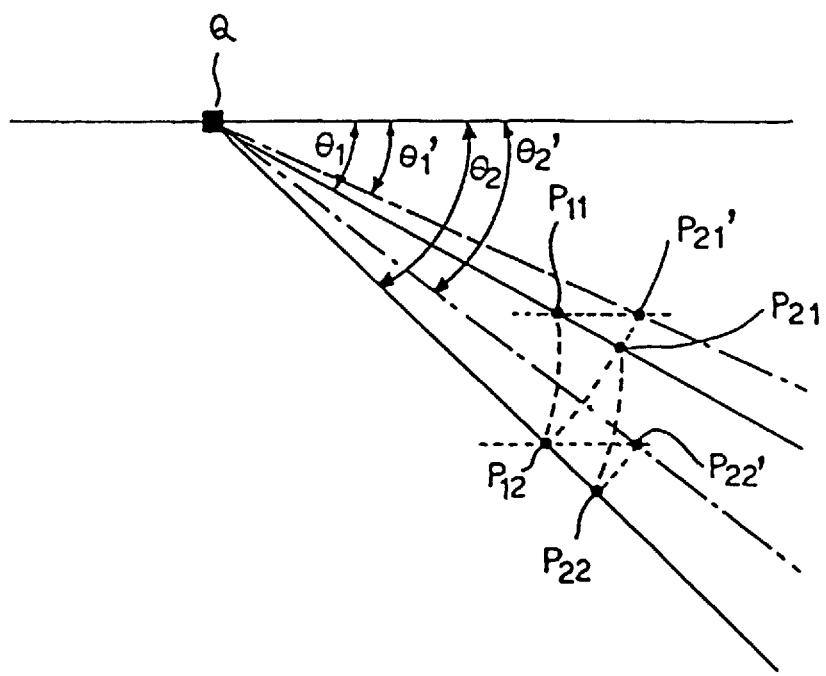
FIG. 16 is a diagram showing a vertical cross section of the receiving beam scanning pattern of FIG. 15.
Figure 29:
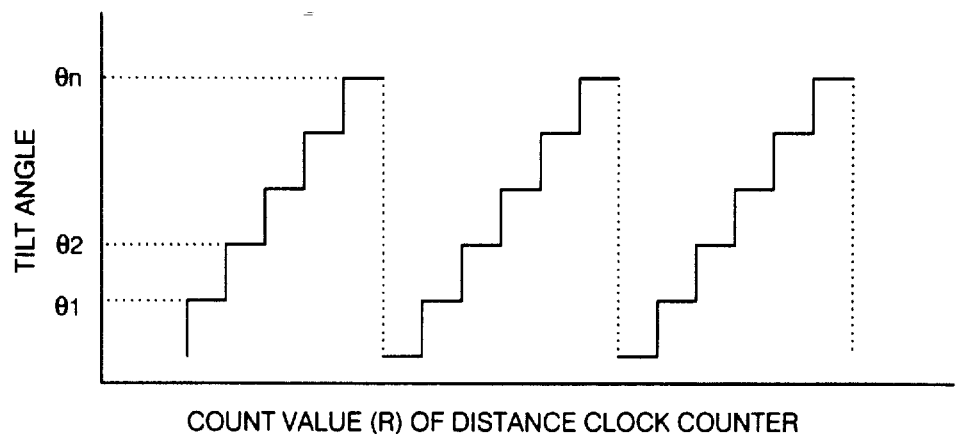
FIG. 29 is a diagram illustrating how receiving beam tilt angles are set when the underwater sounding apparatus of FIGS. 27 and 28 surveys search points $P_{11}$, $P_{12}$, $P_{21}$ and so forth shown in FIG. 16.

The data on tilt angle θ generated by the tilt angle setting data generator 38 is now described in further detail. FIG. 29 depicts an output of the tilt angle setting data generator 38 for causing the receiving beam B to scan in a zigzag pattern as shown in FIG. 16, passing through search points $P_{11}$ (tilt angle $\theta_1$), P12 (tilt angle $\theta_2$), $P_{21}$ (tilt angle $\theta_1$), $P_{22}$ (tilt angle $\theta_2$) and so forth in this order. While the receiving beam B is rotated n times, tilt angle θ is increased in the same number of incremental steps $(\theta_1, \theta_2, \ldots \theta_n)$ as shown in FIG. 29 so that the search point becomes progressively deeper. One such stepwise tilting sequence is referred to as a vertical search cycle. This tilt control operation is repeatedly executed in successive vertical search cycles that follow.

Figure 30:
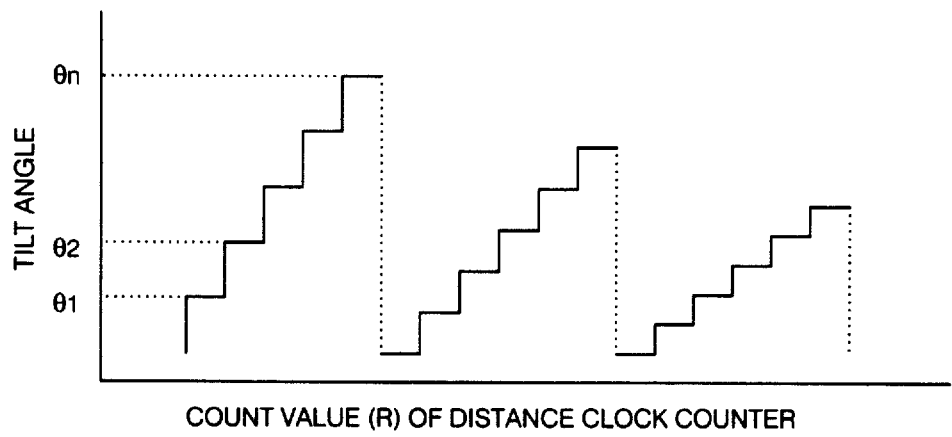
FIG. 30 is a diagram illustrating how receiving beam tilt angles are set when the underwater sounding apparatus of FIGS. 27 and 28 surveys search points $P_{11}$, $P_{12}'$, $P_{21}'$ and so forth shown in FIG. 16.

In the second embodiment, the receiving beam B is maneuvered so that it passes through search points $P_{11}$ (tilt angle $\theta_1$), $P_{12}$ (tilt angle $\theta_2$), $P_{21}'$ (tilt angle $\theta_1'$), $P_{22}'$ (tilt angle $\theta_2'$) and so forth, where point $P_{21}'$ has the same depth as point $P_{11}$, and point $P_{22}'$ has the same depth as point $P_{12}$. Although tilt angle θ is increased stepwise every vertical search cycle, the amount of incremental steps is gradually reduced one cycle after another as shown in FIG. 30. This arrangement enables the receiving beam B to pick up echoes from search points of same depths in successive vertical search cycles for the convenience of three-dimensional depth data presentation.

Data $D_{11}, D_{21}'$ and so forth, picked up from search points $P_{11}, P_{21}'$ and so forth of the first depth, are stored in the first depth layer memory 52-1 while data $D_{12}, D_{22}'$ and so forth picked up from search points $P_{12}, P_{22}'$ and so forth of the second depth are stored in the second depth layer memory 52-2. In this data storage process, data received from search points $P_{11}$ and $P_{12}$ are written in a common address (i.e., at the same horizontal range L and bearing φ) on the assumption that these search points are located on the same vertical line. Data received from search points $P_{21}'$ and $P_{22}'$ are also treated in a similar way.

The depth layer select switches 57 are so activated that sounding data stored in the depth layer memories 52, as described above, is sequentially read out, beginning from the bottommost depth layer memory 52-n, and delivered to the video signal converter 60. The sounding data is then converted into different colors in accordance with water depths and a seabed depth chart, like the example shown in FIG. 11, and is displayed on the indicator 61. If fish school data is stored in a mid-water depth layer memory 52-X, a corresponding fish school patch is shown on top of the seabed depth chart. The fish school patch thus presented may be depicted in different colors or shades of monochrome gradation in accordance with echo levels or depths.

What is claimed is:

1. An underwater detection system for searching an area, comprising:
   a transducer device for transmitting ultrasonic waves and receiving echoes returned from a vertical cross-sectional area oriented in a selected horizontal direction;
   a transducer training means for successively rotating said transducer in a horizontal plane in steps of a specified angle to train said transducer device to transmit and receive said ultrasonic waves from successive vertical cross-sectional areas oriented in successive selected horizontal directions;
   means for scanning a receiving beam of said transducer device to scan said successive vertical cross-sectional areas when said transducer is oriented at each of said successive selected horizontal directions;
   a memory for storing received echo signals containing information on each vertical cross-sectional area searched by said transducer; and
   an indicator for displaying echo signals stored in said memory so that a plan view of the area of search is presented.

2. An underwater detection system as claimed in claim 1, further comprising a discriminator for discriminating between echo data of mid-water objects and that of a water bottom contained in the echo signals received by said transducer and means for selectively displaying only the water bottom or the mid-water objects, or a combination of both with the water bottom in the background.

3. An underwater detection system as claimed in claim 2, further comprising means for displaying only a selected one of the water bottom or the mid-water objects in different colors or in shades of monochrome gradation in accordance with echo signal levels.

4. An underwater detection system as claimed in claim 2, further comprising means for displaying only a selected one of the water bottom or the mid-water objects in different colors or in shades of monochrome gradation in accordance with depth information contained in the received echo signals.

5. An underwater detection system as claimed in claim 2, wherein the mid-water objects are displayed in different colors in accordance with echo signal levels and the water bottom is displayed in different shades of a single color in accordance with depth information contained in the received echo signals when said underwater detection system is set to display both the water bottom and mid-water objects.

6. An underwater detection system as claimed in claim 1, 2, 3, 4 or 5, wherein said underwater detection system displays a vertical cross-sectional view taken in one of said successive selected horizontal directions in addition to the plan view to enable recognition of positional relationships between the water bottom and mid water objects.

7. An underwater detection system as claimed in claim 1, 2, 3, 4, 5 wherein said transducer device is installed on a mobile unit.

8. An underwater detection system which is capable of searching an area around a ship on which said underwater detection system is installed, comprising:
   a transducer for transmitting ultrasonic waves and receiving echoes, said transducer including a plurality of transducer elements arranged in an array;
   a transducer training means for successively rotating said transducer to vary its orientation in a horizontal plane to train said transducer device to transmit and receive said ultrasonic waves from successive vertical cross-sectional areas oriented in successive selected horizontal directions;
   a receiver which forms a receiving beam for scanning said successive vertical cross-sectional areas extending downward from said ship by giving specified time delays or phase differences to echo signals received by said transducer to vary a vertical orientation of said receiving beam while said transducer is oriented in each of said successive selected horizontal directions;
   a vertical cross-sectional image memory for storing echo signal data picked up by the receiving beam in memory elements having addresses defined by horizontal distances relative to said ship and depths;
   a sampling circuit for reading out data of one vertical line after another in a downward direction from said vertical cross-sectional image memory and determining a bottom depth based on detection timing of an echo data peak value in each of said vertical lines;
   a bottom data memory for storing bottom depths determined by said sampling circuit;
   a PPI image generator for producing a fractional PPI image depicting the bottom based on bottom depth data read from said bottom data memory; and
   an indicator for displaying each fractional PPI image produced by said PPI image generator, wherein a complete PPI image of the area of search is obtained by joining fractional PPI images sequentially produced as said transducer is rotated successively.

9. An underwater detection system as claimed in claim 8, further comprising means for setting a sampling depth range so that said sampling circuit reads out data on mid-water objects, while excluding data on the water bottom, from said vertical cross-sectional image memory, and wherein said bottom data memory stores depths of the mid-water objects.

10. An underwater detection system which is capable of searching an area around a ship on which said underwater detection system is installed, comprising:
   a transducer for transmitting ultrasonic waves and receiving echoes, said transducer including a plurality of transducer elements arranged in an array;
   a transducer training means for successively rotating said transducer to vary its orientation in a horizontal plane to train said transducer to transmit and receive said ultrasonic waves from successive vertical cross-sectional areas oriented in successive selected horizontal directions while maintaining said transducer in a fixed vertical orientation;
   a receiver which forms a receiving beam for scanning a vertical cross-sectional area extending downward from own ship by giving specified time delays or phase differences to echo signals received by said transducer to vary a vertical orientation of said receiving beam while said transducer is oriented in each of said successive selected horizontal directions;
   a vertical cross-sectional image memory for storing echo signal data picked up by the receiving beam in memory elements having addresses defined by vertical and horizontal distances relative to said ship;
   a sampling circuit for reading out data of one vertical line after another in a downward direction from said vertical cross-sectional image memory and determining a bottom depth based on detection timing of an echo data peak value in each of said vertical lines;
   a bottom data memory for storing bottom depths determined by said sampling circuit;

an underwater data memory for storing depths or echo signal peak values of mid-water objects obtained from data, which said sampling circuit reads again from said vertical cross-sectional image memory so that bottom echo data is excluded based on the bottom depths stored in said bottom data memory;

a PPI image generator for producing a fractional PPI image depicting the mid-water objects based on their depths or echo signal peak values read from said underwater data memory as well as a fractional PPI image depicting the bottom based on bottom depth data read from said bottom data memory; and an indicator for displaying individual fractional PPI images produced by said PPI image generator, wherein a complete PPI image of the area of search is obtained by joining fractional PPI images sequentially produced as said transducer is rotated successively.

11. An underwater detection system which is capable of searching an area around a ship on which said underwater detection system is installed, comprising:

a transducer for transmitting ultrasonic waves in all directions around said ship and producing a receiving beam which is rotated for receiving echoes all around said ship at varying tilt angles corresponding to tilt angle data;

a tilt angle setting data generator which generates tilt angle data $(\theta_1, \theta_2, \ldots \theta_n)$ for first n rotations of the receiving beam, tilt angle data $(\theta_1', \theta_2', \ldots \theta_n')$ for second n rotations of the receiving beam, tilt angle data $(\theta_1'', \theta_2'', \ldots \theta_n'')$ for third n rotations of the receiving beam, and so forth for varying the tilt angle $\theta$ of the receiving beam in incremental steps to perform three-dimensional underwater sounding in such a manner that corresponding rotations of said first second, third and so forth rotations of the receiving beam scan search points of same depths displaced horizontally from one another by corresponding ones of said tilt angle data in each horizontal direction $\phi$ of said rotated receiving beam; and an indicator for displaying a plan view of the area of search produced from data on echo signals obtained for individual depths in such scanning sequences.

12. An underwater detection system as claimed in claim 11, further comprising means for setting a sampling depth range so that said underwater detection system is capable of selectively displaying only the water bottom or mid-water objects in different colors or in shades of monochrome gradation in accordance with echo signal levels.

13. An underwater detection system as claimed in claim 11, further comprising means for setting a sampling depth range so that said underwater detection system is capable of selectively displaying only the water bottom or mid-water objects in different colors or in shades of monochrome gradation in accordance with depth information contained in the received echo signals.

14. An underwater detection system as claimed in claim 11, further comprising means for setting a sampling depth range so that mid-water objects are displayed in different colors in accordance with echo signal levels and the water bottom is displayed in the background of the mid-water objects in different shades of a single color in accordance with depth information.

15. An underwater detection system as claimed in claim 11, wherein said transducer is installed on a mobile unit.

16. An underwater detection system comprising:

a transducer having a plurality of annular arrays stacked one on top of another in a cylindrical shape, each annular array including a plurality of transducer elements;

vertical phase synthesizers for forming receiving beams tipped to a desired tilt angle $\theta$ by giving specified time delays or phase differences to echo signals received by each vertical column of transducer elements;

a switching circuit for selecting echo signals picked up by a group of receiving beams and outputted from corresponding vertical phase synthesizers;

a horizontal phase synthesizer for forming a synthesized receiving beam pointing in a desired horizontal direction $\phi$ and tipped to the tilt angle $\theta$ by giving specified time delays or phase differences to the echo signals outputted from said switching circuit;

a tilt angle setting data generator which generates tilt angle data $(\theta_1, \theta_2, \ldots \theta_n)$ in first n rotations of the receiving beam, tilt angle data $(\theta_1', \theta_2', \ldots \theta_n')$ in second n rotations of the receiving beam, tilt angle data $(\theta_1'', \theta_2'', \ldots \theta_n'')$ in third n rotations of the receiving beam, and so forth for varying the tilt angle $\theta$ of the receiving beam in incremental steps to perform three-dimensional underwater sounding in such a manner that the receiving beam scans search points of same depths at respective tilt angles in each horizontal direction $\phi$; and a depth layer memory for separately storing echo signal data fed from said horizontal phase synthesizer depending on depths from which the echo signal data are obtained;

wherein a plan view of an area of search is produced from the echo signal data stored in said depth layer memory.

17. An underwater detection system which is capable of searching an area around a ship on which said underwater detection system is installed, comprising:

a transducer which transmits and receives ultrasonic signals;

means for scanning a receiving beam of said transducer along a curved surface of circular cones of incrementally varying solid angles having an apex located on the underside of said transducer;

a memory for storing received echo signals containing information on each of a plurality of horizontal cross-sectional planes of said area searched by said transducer; and an indicator for displaying a plan view of the area of search produced from the echo signals stored in said memory.

18. An underwater detection system which is capable of searching an area, comprising:

a transducer which transmits and receives ultrasonic signals;

search means for scanning underwater conditions both in horizontal and vertical directions around said transducer;

selection means for deriving from received echoes signals representing the seabed;

storing means for storing the signals representing the seabed read from said selecting means; and an indicator for displaying the signals read from said storing means.

19. An underwater detection system which is capable of searching an areas, comprising:

a transducer which transmits and receives ultrasonic signals;

search means for scanning underwater conditions both in horizontal and vertical directions around said transducer;

selection means for deriving from received echoes signals representing targets above the seabed;

storing means for storing the signals representing the targets read from said selecting means; and an indicator for displaying the signals read from said storing means.

20. An underwater detection system which is capable of searching a large area comprising:

a transducer which transmits and receives ultrasonic signals;

search means for scanning underwater conditions both in horizontal and vertical directions around said transducer;

a discriminator for discriminating between echo data of mid-water objects and that of the water bottom con tained in the echo signals received by said transducer; and an indicator for selectively displaying only the water bottom or the mid-water objects, or a combination of both with the bottom in the background.

21. An underwater detection system as claimed in claims 18, 19 or 20 wherein the transducer is installed on a moving body.

22. An underwater detection system as claimed in claims 18, 19 or 20 wherein the transducer comprises a plurality of transducers lineally disposed, and the search means rotates the transducer in a horizontal plane.

* * * * *